United States Patent [19]
Katayama et al.

[11] Patent Number: 5,894,499
[45] Date of Patent: Apr. 13, 1999

[54] DIRECT CONVERSION RECEIVER HAVING FILTER WITH CUT-OFF FREQUENCY SWITCHING MEANS

[75] Inventors: Hiroshi Katayama, Kanagawa; Yasumi Imagawa, Ishikawa; Masahiro Mimura, Tokyo, all of Japan

[73] Assignee: Matsushita Electric Industrial Co., Ltd., Osaka, Japan

[21] Appl. No.: 08/796,911

[22] Filed: Feb. 6, 1997

[30] Foreign Application Priority Data

Feb. 9, 1996 [JP] Japan .................................. 8-046865

[51] Int. Cl.$^6$ ........................................................ H04L 27/14
[52] U.S. Cl. ........................................... 375/334; 375/377
[58] Field of Search .......................................... 375/272, 273, 375/275, 229, 232, 316, 334, 335, 377; 329/300; 327/353, 557, 558

[56] References Cited

U.S. PATENT DOCUMENTS

| | | | |
|---|---|---|---|
| 4,815,106 | 3/1989 | Propp et al. ........................... | 375/350 |
| 4,972,439 | 11/1990 | Kuznicki et al. ..................... | 375/296 |
| 5,565,812 | 10/1996 | Soenen ................................. | 327/558 |
| 5,760,641 | 6/1998 | Granger-Jones et al. ............. | 327/553 |

*Primary Examiner*—Tesfaldet Bocure
*Attorney, Agent, or Firm*—Pearne, Gordon, McCoy & Granger LLP

[57] ABSTRACT

A direct conversion receiver has: an I-low-pass filter 9 which has cut-off frequency switching device, switches over the cut-off frequency in accordance with the transmission rate, and eliminates high-frequency components from a modulated signal mixed with a first local signal; a Q-low-pass filter 10 which eliminates high-frequency components from a modulated signal mixed with the first local signal phase-shifted by 90 degrees; transmission rate detecting device 13 for detecting transmission rate information from transmission data detected by transmission data detecting device 12; and I- and Q-low-pass filter cut-off frequency controlling device 15 and 16 for generating I- and Q-control signals which control the cut-off frequency switching device, from the detected transmission rate. The cut-off frequencies of the low-pass filters are switched over in accordance with the transmission rate of reception.

10 Claims, 11 Drawing Sheets

5,894,499

1

DIRECT CONVERSION RECEIVER HAVING FILTER WITH CUT-OFF FREQUENCY SWITCHING MEANS

BACKGROUND OF THE INVENTION

The invention relates to a receiver which is used in a mobile communications apparatus such as a personal handy phone, a portable phone, and a pager, to which the direct conversion system is applied.

Recently, radio communication apparatuses such as a personal handy phone, a portable phone, a pager, and a cordless phone have become widespread. As the modulation system for such radio communications apparatuses, usually, the frequency modulation, the phase modulation, the frequency shift keying, or the like is used. One of known receivers to which such a modulation system is applied is a direct conversion receiver having a configuration which can be easily integrated and which is suitable for miniaturization and lightening.

Such a direct conversion receiver of the prior art is configured as disclosed in, for example, Japanese patent publication (Kokai) 4-137927. An example of such a receiving circuit of the prior art is shown in FIG. 12. FIG. 12 is a block diagram showing the main receiving circuit portion of a direct conversion receiver of the prior art.

Hereinafter, the configuration of a receiving circuit of a direct conversion receiver of the prior art to which the frequency shift keying (abbreviated as "FSK") is applied will be described with reference to FIG. 12. In FIG. 12, reference numeral 1 designates a receiving antenna which receives a radio signal; 2, a received signal amplifier which amplifies the received signal from the receiving antenna 1 and outputs a modulated signal 3; 4, a first local oscillator which generates a first local signal 5 of a frequency that is approximately equal to the carrier frequency of the received transmission signal; 6, a 90-degree phase shifter which rotates the phase of the first local signal 5 by 90 degrees; 7, a first signal mixer which mixes the modulated signal 3 with the first local signal 5; and 8, a second signal mixer which mixes the modulated signal 3 with the signal that is obtained by phase-shifting the first local signal 5 by 90 degrees.

Furthermore, reference numeral 32 designates an I-lowpass filter which allows only an I baseband signal (in this example, low-frequency components) that is included in the output signal of the first signal mixer 7 and in phase with the received signal, to pass therethrough, thereby outputting an I-baseband signal 17, and in which the cut-off frequency is not varied. The reference numeral 33 designates a Q-lowpass filter which allows only a Q baseband signal (in this example, low-frequency components) that is included in the output signal of the second signal mixer 8 and phase-shifted by 90 degrees, to pass therethrough, thereby outputting a Q-baseband signal 18 that is perpendicular to the I-baseband signal 17, and in which the cut-off frequency is not varied. The reference numeral 11 designates detecting means for adding the received I-baseband signal 17 with Q-baseband signal 18, and conducting detection to output a demodulated signal 19, and 12 designates received data detecting means for judging the demodulated signal 19 to output the received data.

The operation of the receiving circuit of the direct conversion receiver of the prior art will be described with reference to the same figure or FIG. 12. A radio signal which is received by the receiving antenna 1 is amplified by the received signal amplifier 2, and then output as the modulated signal 3 to the first and second signal mixers 7 and 8. On the

2 other hand, the first local signal 5 generated by the first local oscillator 4 is mixed in the first signal mixer 7 with the modulated signal 3, and then output to the I-low-pass filter 32. At the same time, the first local signal is rotated in phase by 90 degrees by the 90-degree phase shifter 6, then mixed in the second signal mixer 8 with the modulated signal 3, and then output to the Q-low-pass filter 33.

The I-baseband signal 17 and Q-baseband signal 18 which have passed through the I- and Q-low-pass filters 32 and 33 are added with each other in the detecting means 11, and then the summed signal is waveform-shaped, detected, and demodulated to be output as the demodulated signal 19 to the received data detecting means 12. The received data detecting means 12 samples the demodulated signal 19, detects received data sent from a transmission station (not shown), and outputs the detected received data to other processing means such as a CPU.

With the recent rapid propagation of small and light mobile communications apparatuses such as a personal handy phone, a pager, a cordless phone, and a portable phone, the demand for a direct conversion receiver which is suitable for integration is growing. On the other hand, with the expansion of the number of users of mobile communications apparatuses, also the communications capacity of the mobile communication is rapidly increased. In order to cope with such increases of the demand for mobile communications apparatuses, it is urgently required to increase the transmission data rate (hereinafter, referred to as "transmission rate") and narrow the band of the communication frequency.

In order to satisfy the requirement, in a pager, for example, a system in which a plurality of transmission rates are variable (the transmission rate can be dynamically changed among plural defined ones) is specified in the advanced radio paging system standard (RCR STD-43).

In the case where a single and fixed transmission rate is used as in the prior art, there arises no problem even when the cut-off frequency of a baseband filter which is used in the direct conversion receiver of the prior art is fixed (hereinafter, th term "baseband filter" does not mean a filter of a particular kind or an I-, Q-, high, or low-pass filter, but is used as a general term for filters including those of such kinds). In other words, for a fixed transmission rate, it is possible to use an optimum baseband filter having a cut-off frequency fixed to a value at which adjacent channel interference is small in level and the reception sensitivity is optimum.

In the case where such a direct conversion receiver of the prior art is used in a system wherein a plurality of transmission rates are variable as specified in the advanced radio paging system standard, however, there arises the following problem. When the transmission rate is changed, such a baseband filter used in the prior art direct conversion receiver is deviated from the optimum state, so that adjacent channel interference occurs and the reception sensitivity is lowered.

SUMMARY OF THE INVENTION

The invention has been conducted in order to solve the problem of the prior art. It is an object of the invention to provide a direct conversion receiver having a baseband filter in which, even when the transmission rate of a received signal is changed, a demodulated signal can be obtained at any transmission rate without impairing the reception sensitivity and receiving adjacent channel interference.

The direct conversion receiver of the invention generates a first local signal of a frequency which is approximately equal to a carrier frequency of a modulated signal, and comprises: an I-low-pass filter which receives a signal obtained by mixing the first local signal with the modulated signal, eliminates high-frequency components, and extracts an I-baseband signal; a Q-low-pass filter which receives a signal obtained by mixing a signal obtained by phase-shifting the first local signal by 90 degrees with the modulated signal, eliminates high-frequency components, and extracts a Q-baseband signal; detecting means for processing the I- and Q-baseband signals, and outputting a demodulated signal; and received data detecting means for judging the demodulated signal, and outputting received data, and further comprises:

transmission rate detecting means for detecting transmission rate information from the received data, and outputting a transmission rate signal; I-low-pass filter cut-off frequency controlling means for outputting an I-control signal to the I-low-pass filter on the basis of the transmission rate signal, the I-control signal controlling the cut-off frequency of the I-low-pass filter; and Q-low-pass filter cut-off frequency controlling means for outputting a Q-control signal to the Q-low-pass filter on the basis of the transmission rate signal, the Q-control signal controlling the cut-off frequency of the Q-low-pass filter. The I-low-pass filter comprises cut-off frequency switching means for switching over the cut-off frequency under control of the I-control signal in accordance with the transmission rate of a received signal, and eliminates high-frequency components from an input signal obtained as a result of mixing, in accordance with the cut-off frequency which is switched over. The Q-low-pass filter comprises cut-off frequency switching means for switching over the cut-off frequency under control of the Q-control signal in accordance with the transmission rate of the received signal, and eliminates high-frequency components from an input signal obtained as a result of mixing, in accordance with the cut-off frequency which is switched over.

According to the invention, it is possible to provide a direct conversion receiver in which, at any transmission rate, the reception sensitivity is improved or maintained at an optimum level, and a demodulated signal wherein adjacent channel interference is eliminated or at the lowest level can be obtained.

According to the invention, the direct conversion receiver comprises: a first local oscillator which generates a first local signal of a frequency which is approximately equal to a carrier frequency of a modulated signal; a 90-degree phase shifter which phase-shifts the first local signal by 90 degrees; a first signal mixer which mixes the modulated signal with the first local signal; a second signal mixer which mixes the modulated signal with the 90-degree phase-shifted signal; a first I-low-pass filter which comprises cut-off frequency switching means for switching over and setting a cut-off frequency under control of an I-control signal in accordance with a transmission rate of a received signal, and which eliminates high-frequency components from an output signal of the first signal mixer in accordance with the cut-off frequency which is switched over and set, and extracts an I-baseband signal; a first Q-low-pass filter which comprises cut-off frequency switching means for switching over and setting a cut-off frequency under control of a Q-control signal in accordance with the transmission rate of the received signal, and which eliminates high-frequency components from an output signal of the second signal mixer in accordance with the cut-off frequency which is switched over and set, and extracts a Q-baseband signal; detecting means for processing the I-baseband signal and the Q-baseband signal, and outputting a demodulated signal; received data detecting means for judging the demodulated signal, and outputting received data; transmission rate detecting means for detecting transmission rate information from the received data, and outputting a transmission rate signal; I-low-pass filter cut-off frequency controlling means for outputting the I-control signal to the first I-low-pass filter under control of the transmission rate signal, the I-control signal controlling the cut-off frequency of the first I-low-pass filter; and Q-low-pass filter cut-off frequency controlling means for outputting the Q-control signal to the first Q-low-pass filter under control of the transmission rate signal, the Q-control signal controlling the cut-off frequency of the first Q-low-pass filter, the cut-off frequencies of the first I- and Q-low-pass filters being switched over and set in accordance with the transmission rate of the received signal. The invention attains the effects that, at any transmission rate, the reception sensitivity is improved or maintained at an optimum level and a demodulated signal wherein adjacent channel interference is eliminated or at a lower level can be obtained.

Further, the direct conversion receiver comprises: an I-high-pass filter which eliminates low-frequency components from the output signal of the first signal mixer in accordance with the cut-off frequency which is set, and which outputs high-frequency components containing desired modulating components to the first I-low-pass filter; and a Q-high-pass filter which eliminates low-frequency components from the output signal of the second signal mixer in accordance with the cut-off frequency which is set, and which outputs high-frequency components containing desired modulating components to the first Q-low-pass filter. The invention attains the effects that, at any transmission rate, the reception sensitivity is improved or maintained at an optimum level and a demodulated signal wherein adjacent channel interference is eliminated or at the lowest level can be obtained.

Further, the direct conversion receiver comprises: a first local oscillator which generates a first local signal of a frequency which is approximately equal to a carrier frequency of a modulated signal; a 90-degree phase shifter which phase-shifts the first local signal by 90 degrees; a first signal mixer which mixes the modulated signal with the first local signal; a second signal mixer which mixes the modulated signal with the 90-degree phase-shifted signal; an I-high-pass filter which comprises cut-off frequency switching means for switching over and setting a cut-off frequency under control of an I-control signal in accordance with a transmission rate of a received signal, and which eliminates low-frequency components from an output signal of the first signal mixer in accordance with the cut-off frequency which is switched and set, and outputs high-frequency components containing desired modulating components; a second I-low-pass filter which eliminates high-frequency components from the high-frequency components containing desired modulating components and output from the I-high-pass filter, in accordance with the cut-off frequency which is set, and extracts an I-baseband signal; a Q-high-pass filter which comprises cut-off frequency switching means for switching over and setting a cut-off frequency under control of a Q-control signal in accordance with the transmission rate of the received signal, and which eliminates low-frequency components from an output signal of the second signal mixer in accordance with the cut-off frequency which is switched and set, and outputs high-frequency components containing desired modulating components; a second Q-low-pass filter which eliminates high-frequency components from the high-frequency components containing desired modulating components and output from the Q-high-pass filter, in accordance with the cut-off frequency which is set, thereby extracting a Q-baseband signal; detecting means for processing the I-baseband signal and the Q-baseband signal, and outputting a demodulated signal; received data detecting means for judging the demodulated signal, and outputting received data; transmission rate detecting means for detecting transmission rate information from the received data, and outputting a transmission rate signal; I-high-pass filter cut-off frequency controlling means for outputting the I-control signal to the I-high-pass filter under control of the transmission rate signal, the I-control signal controlling the cut-off frequency of the I-high-pass filter; and Q-high-pass filter cut-off frequency controlling means for outputting the Q-control signal to the Q-high-pass filter under control of the transmission rate signal, the Q-control signal controlling the cut-off frequency of the Q-high-pass filter, the cut-off frequencies of the I- and Q-high-pass filters being switched and set in accordance with the transmission rate of the received signal. The invention attains the effects that, at any transmission rate, the reception sensitivity is improved or maintained at an optimum level and a demodulated signal wherein adjacent channel interference is eliminated or at the lowest level can be obtained.

Further, the direct conversion receiver is configured so that, the second I-low-pass filter comprises cut-off frequency switching means for switching over and setting the cut-off frequency under control of an I-control signal in accordance with the transmission rate of the received signal, eliminates high-frequency components from the high-frequency components containing the desired modulating components and output from the I-high-pass filter in accordance with the cut-off frequency which is switched over and set, and extracts the I-baseband signal, and the second Q-low-pass filter comprises cut-off frequency switching means for switching over and setting the cut-off frequency under control of a Q-control signal in accordance with the transmission rate of the received signal, eliminates high-frequency components from the high-frequency components containing the desired modulating components and output from the Q-high-pass filter in accordance with the cut-off frequency which is switched over and set, and extracts the Q-baseband signal. The invention attains the effects that, at any transmission rate, the reception sensitivity is improved or maintained at an optimum level and a demodulated signal wherein adjacent channel interference is eliminated or at the lowest level can be obtained.

Further, the direct conversion receiver of the invention is configured so that, the detecting means comprises: a second local oscillator which generates a second local signal which is lower in frequency than the first local signal; a second 90-degree phase shifter which phase-shifts the second local signal by 90 degrees; a third signal mixer which mixes the I-baseband signal with the signal which is obtained by phase-shifting the second local signal by 90 degrees; a fourth signal mixer which mixes the Q-baseband signal with the second local signal; a signal adder which adds output signals of the third and fourth signal mixers with each other; a waveform shaping filter which comprises a high-pass filter and a low-pass filter, and which limits a passband, and extracts only the desired modulating components from an output signal of the signal adder; and a frequency detector which detects a frequency of an output signal of the waveform shaping filter, converts the frequency into a voltage value, and outputs the demodulated signal. The invention attains the effects that, at any transmission rate, the reception sensitivity is improved or maintained at an optimum level and a demodulated signal wherein adjacent channel interference is eliminated or at the lowest level can be obtained.

Further, the direct conversion receiver of the invention is configured so that, each of the cut-off frequency switching means comprises at least one capacitive element, at least one resistive element, and at least one switch, and the switch is controlled by the I- or Q-control signal to switch over and change a capacitance of the capacitive element or a resistance of the resistive element, thereby switching over the cut-off frequency of the low- or high-pass filter. The invention attains in a simple configuration the effects that, at any transmission rate, the reception sensitivity is improved or maintained at an optimum level and a demodulated signal wherein adjacent channel interference is eliminated or at the lowest level can be obtained.

The direct conversion receiver of the invention is configured so that, each of the cut-off frequency switching means comprises at least one capacitive element, at least one resistive element, and at least one switch, and the switch is controlled by the I- or Q-control signal to switch over and change a capacitance of the capacitive element and a resistance of the resistive element, thereby switching over the cut-off frequency of the low- or high-pass filter. The invention attains in a simple configuration the effects that, at any transmission rate, the reception sensitivity is further improved or maintained at an optimum level and a demodulated signal wherein adjacent channel interference is eliminated or at the lowest level can be obtained.

DETAILED DESCRIPTION OF PREFERRED EMBODIMENTS

Figure 1A:
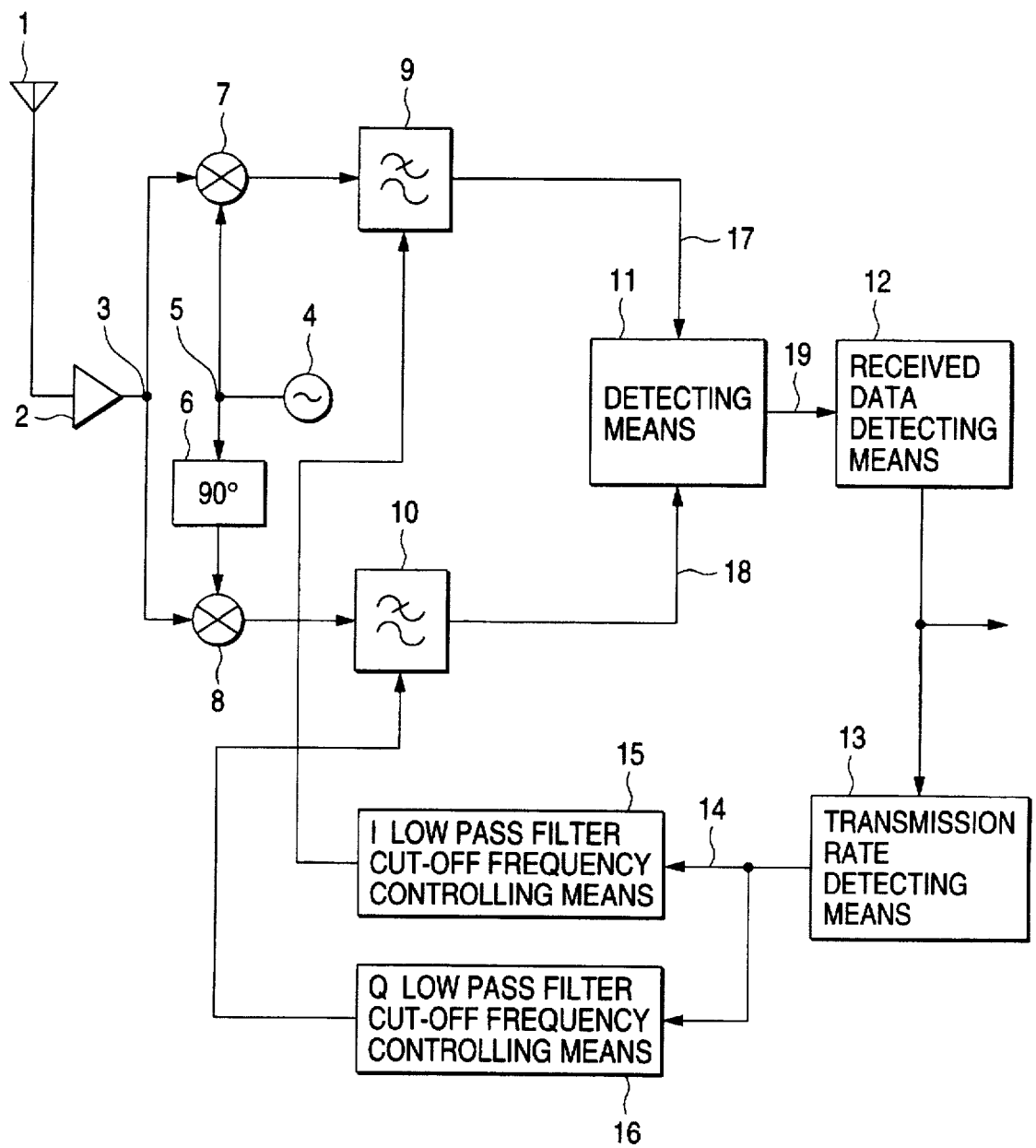
FIGS. 1A and 1B are block diagrams showing the main receiving circuit portion of a direct conversion receiver of a first embodiment of the invention.
Figure 1B:
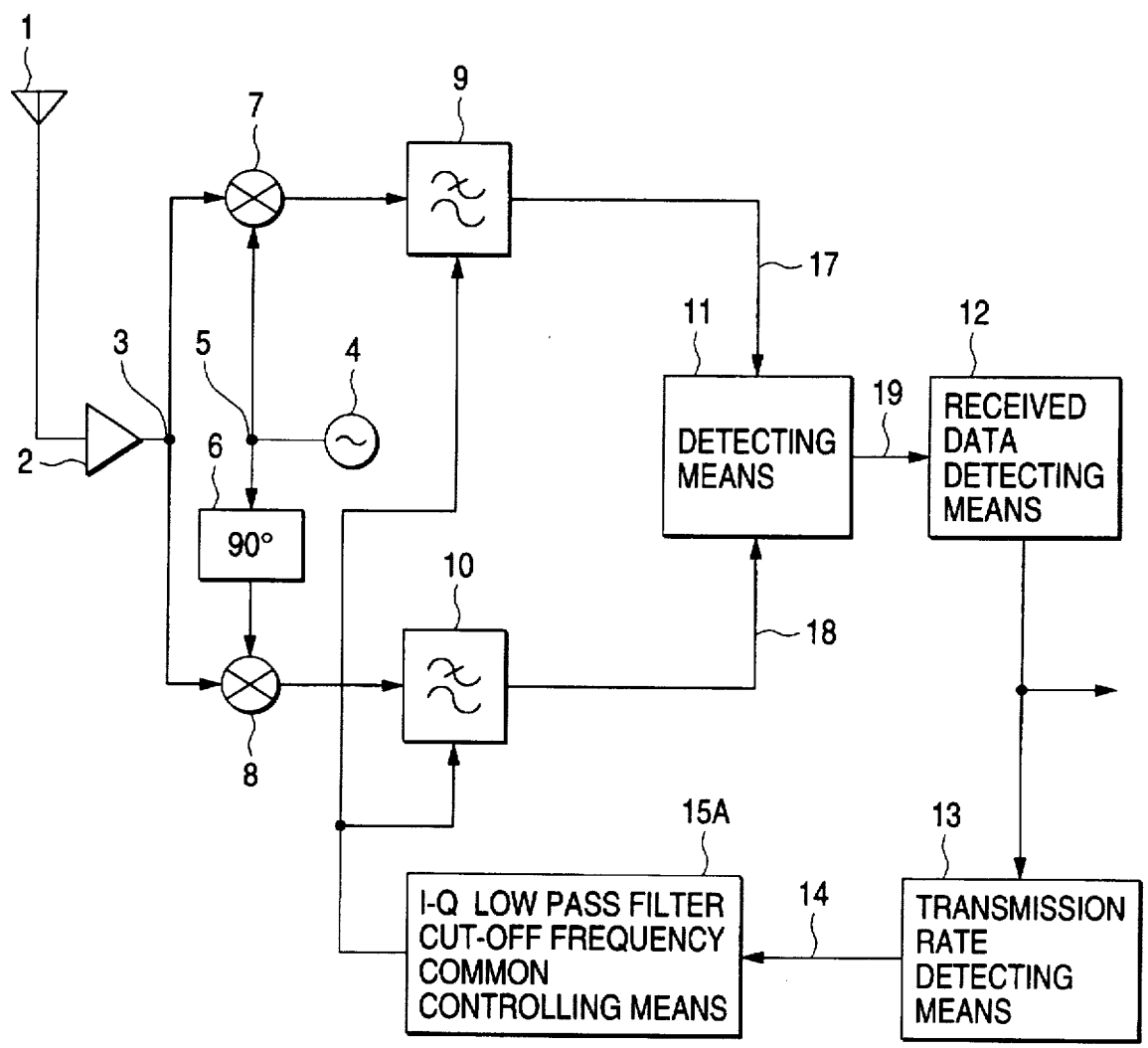
Figure 2A:
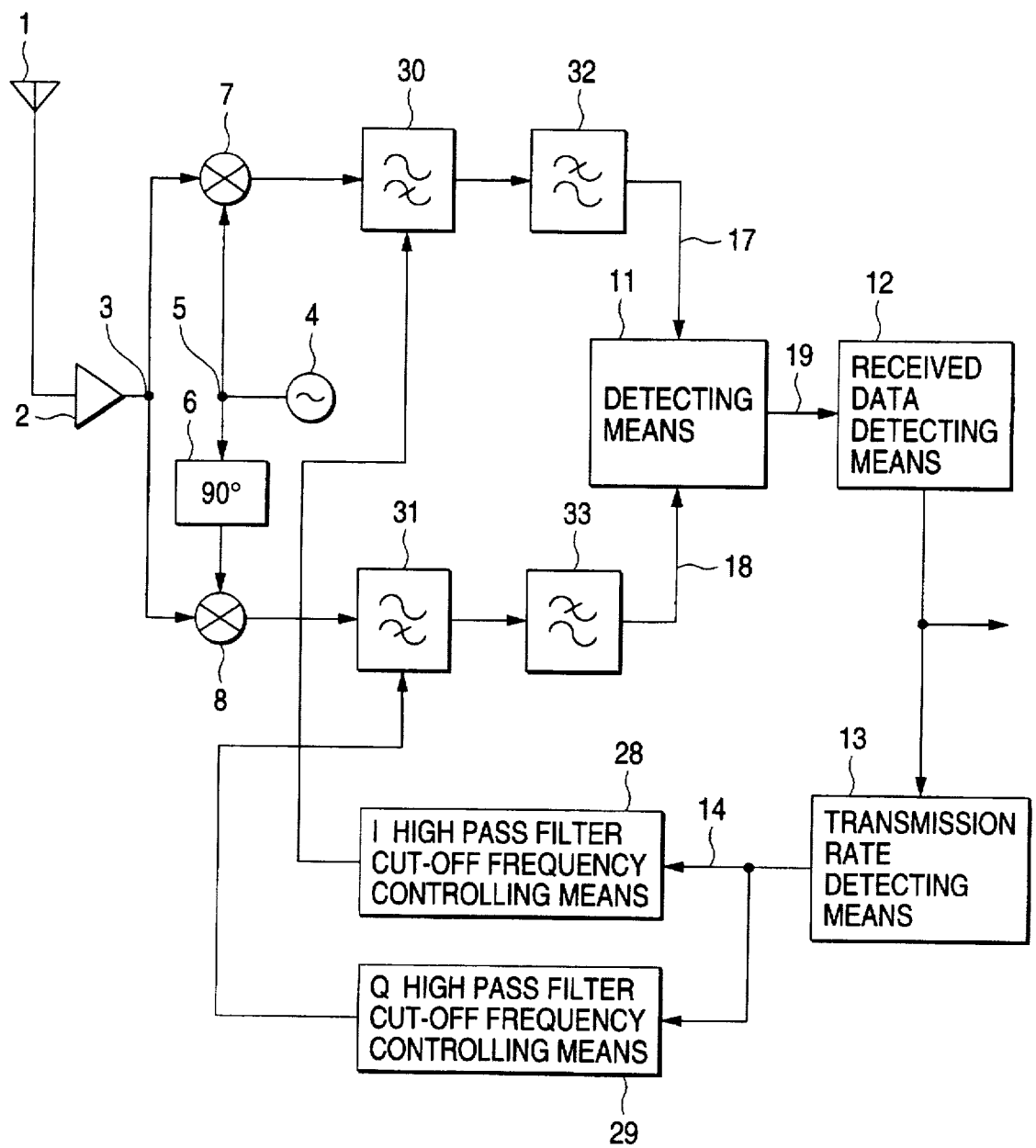
FIGS. 2A and 2B are block diagrams showing the main receiving circuit portion of a direct conversion receiver of a second embodiment of the invention.
Figure 2B:
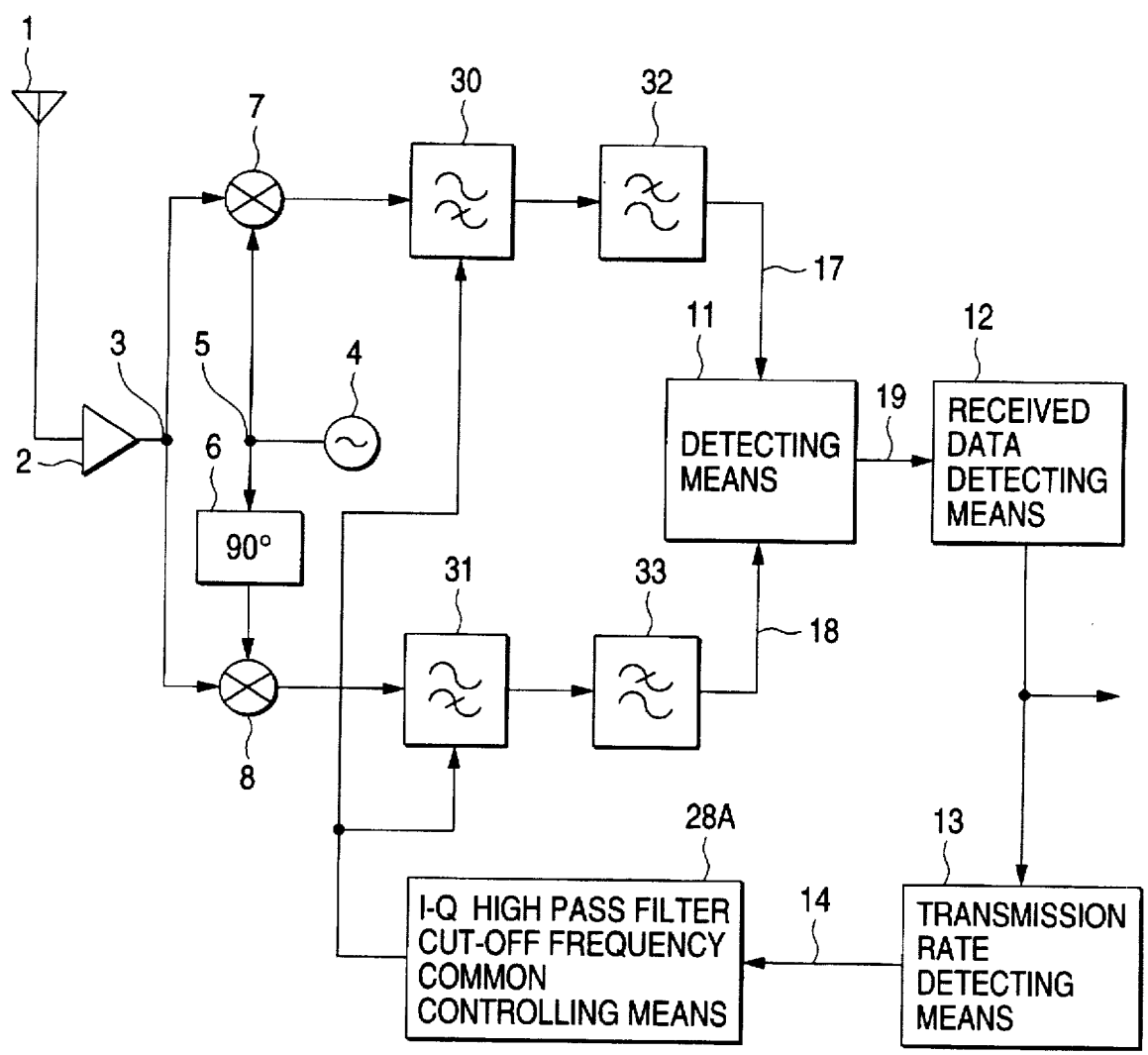
Figure 3:
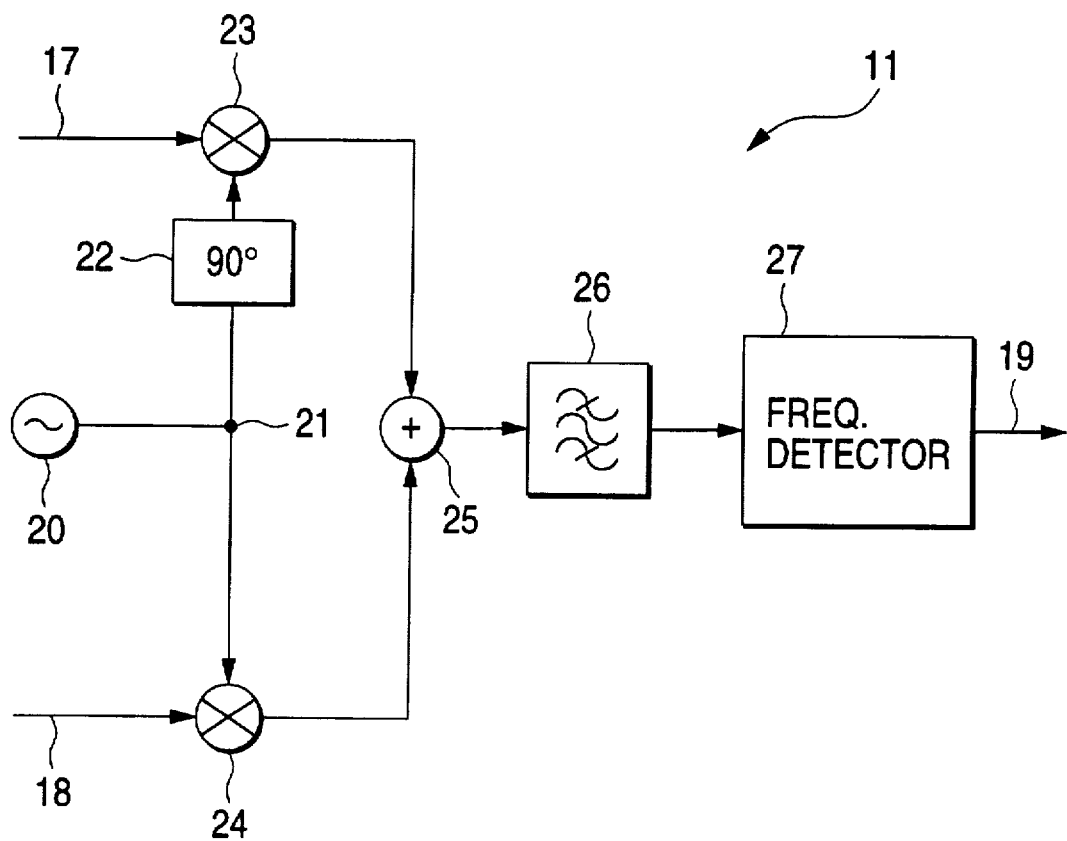
FIG. 3 is a block diagram showing in detail detecting means shown in FIGS. 1 and 2.

Hereinafter, embodiments of the invention will be described in detail with reference to FIGS. 1A to 11. FIGS. 1A and 1B are block diagrams showing the main receiving circuit portion of a direct conversion receiver of a first embodiment of the invention. FIGS. 2A and 2B are block diagrams showing the main receiving circuit portion of a direct conversion receiver of a second embodiment of the invention. FIG. 3 is a block diagram showing in detail detecting means shown in FIGS. 1A, 1B, 2A and 2B, and FIG. 4 is a diagram showing the beginning portion of a transmission frame according to a protocol which is used for informing of the transmission rate to be transmitted in the first and second embodiments shown in FIGS. 1A, 1B, 2A and 2B.

Figure 5:
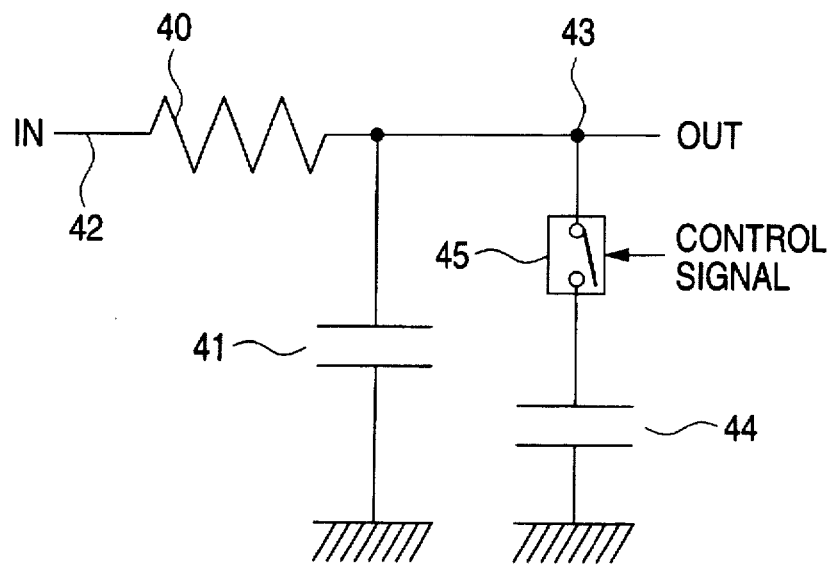
FIG. 5 is a circuit diagram showing an example of a low-pass filter comprising cut-off frequency switching means which is used in the first embodiment.
Figure 6:
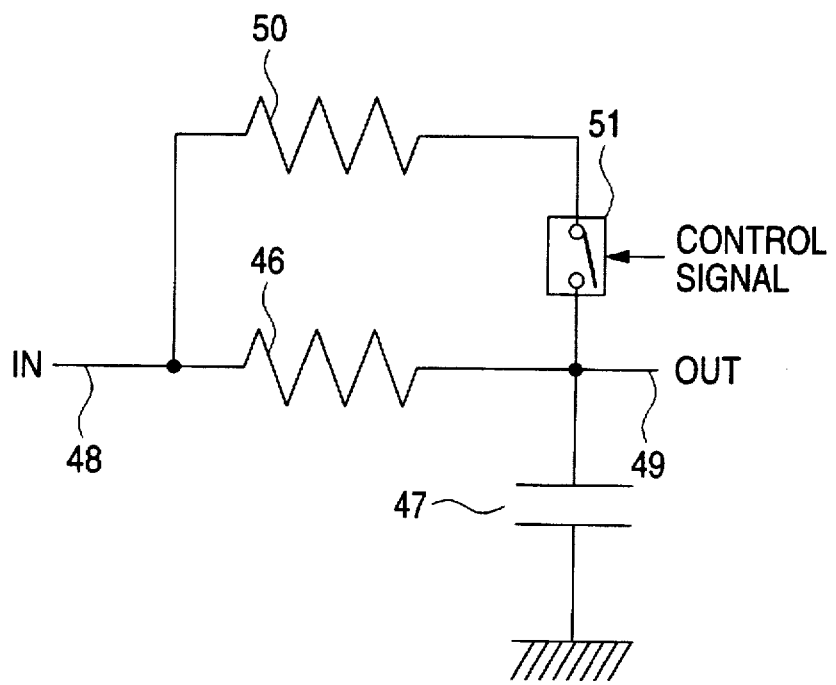
FIG. 6 is a circuit diagram showing another example of the low-pass filter comprising cut-off frequency switching means which is used in the first embodiment.
Figure 7:
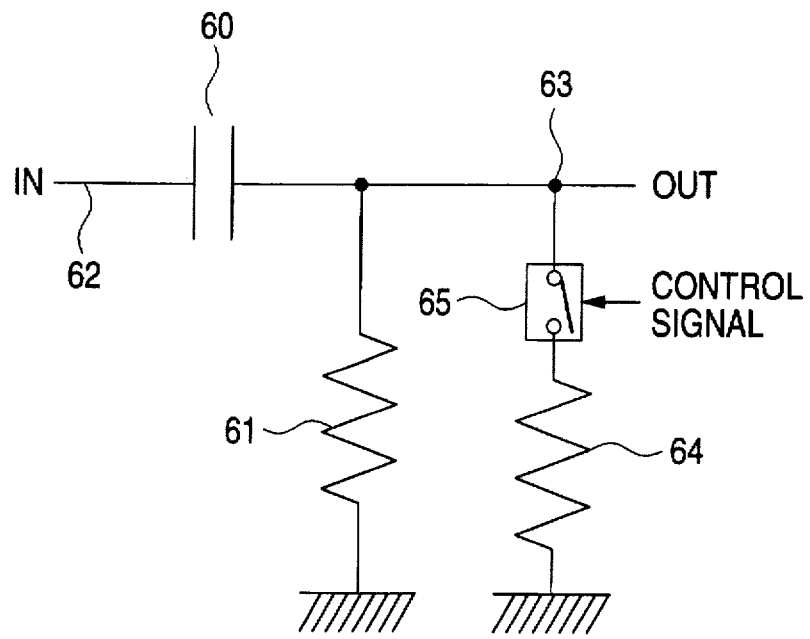
FIG. 7 is a circuit diagram showing an example of a low-pass filter comprising cut-off frequency switching means which is used in the second embodiment.
Figure 8:
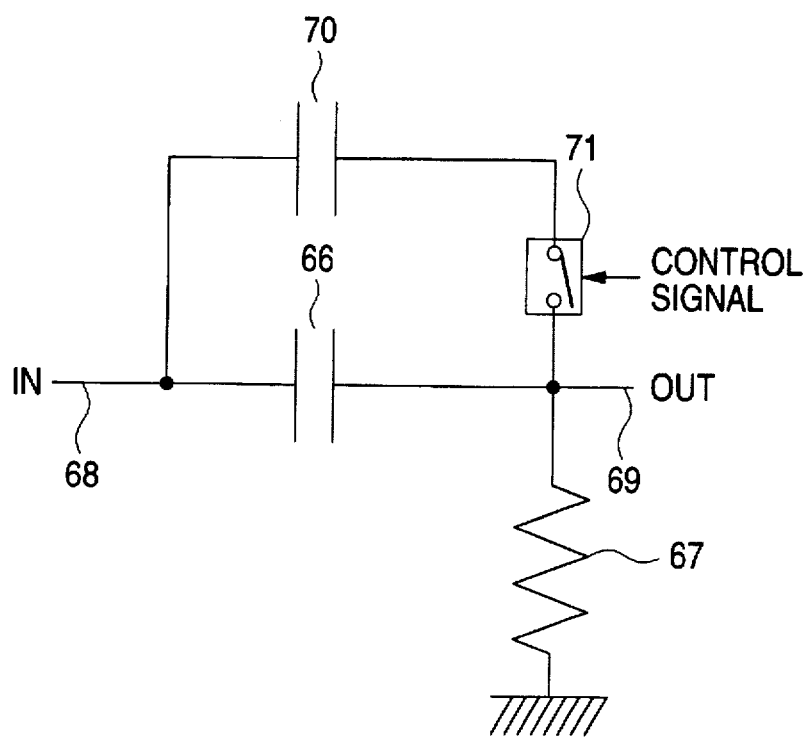
FIG. 8 is a circuit diagram showing another example of the low-pass filter comprising cut-off frequency switching means which is used in the second embodiment.

FIG. 5 is a circuit diagram showing an example of a low-pass filter comprising cut-off frequency switching means (or a cut-off frequency control input) which is used in the first embodiment shown in FIGS. 1A and 1B, FIG. 6 is a circuit diagram showing another example of the low-pass filter comprising cut-off frequency switching means (or the apparatus cut-off frequency control input) which is used in the first embodiment shown in FIGS. 1A and 1B, FIG. 7 is a circuit diagram showing an example of a low-pass filter comprising cut-off frequency switching means (or a cut-off frequency control input) which is used in the second embodiment shown in FIGS. 2A and 2B, and FIG. 8 is a circuit diagram showing another example of the low-pass filter comprising cut-off frequency switching means (or the apparatus cut-off frequency control input) which is used in the second embodiment shown in FIGS. 2A and 2B.

Figure 9:
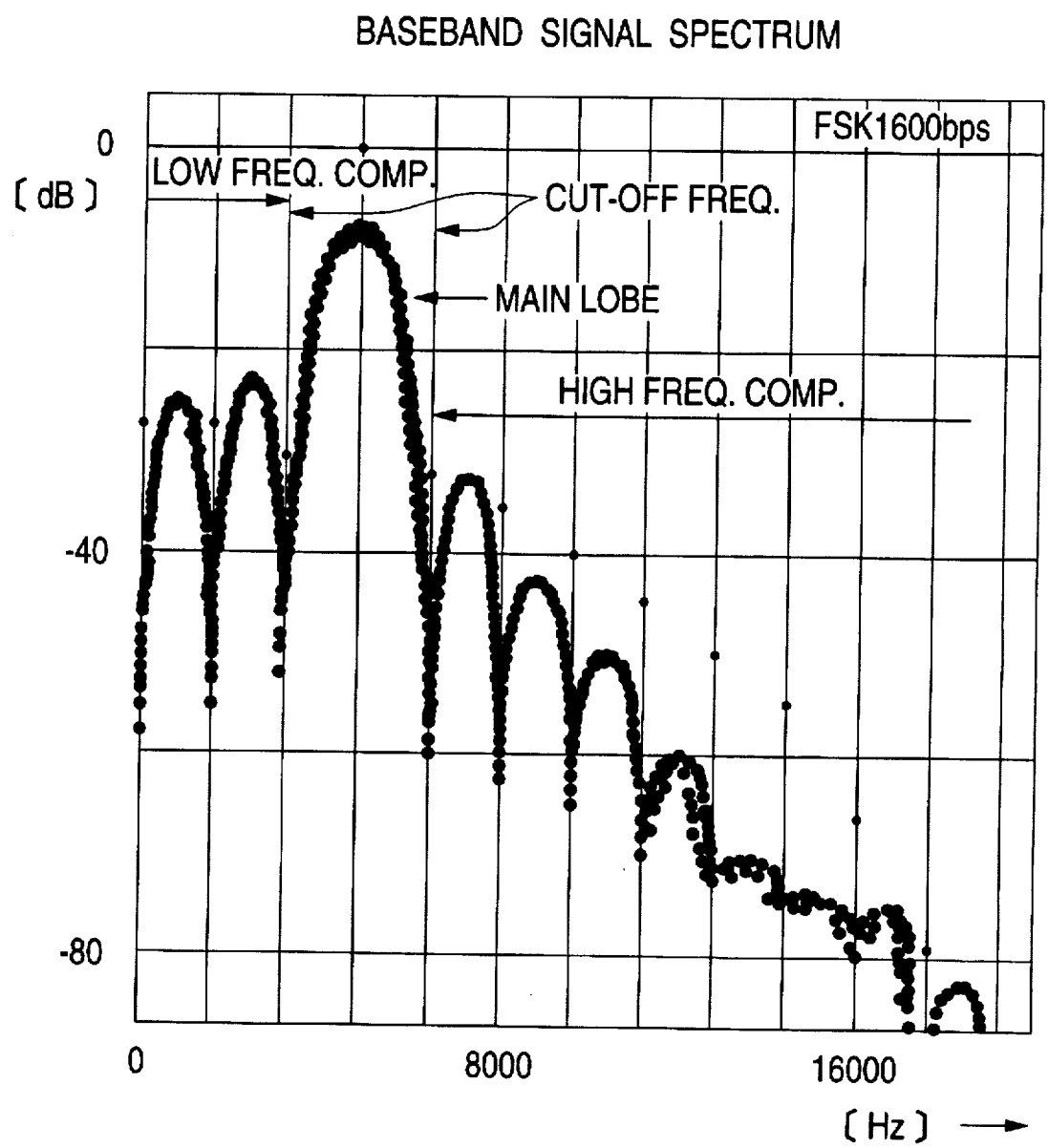
FIG. 9 is a graph showing an example of a spectrum of a signal which is input to a baseband filter at a transmission rate of binary FSK 1,600 bps.
Figure 10:
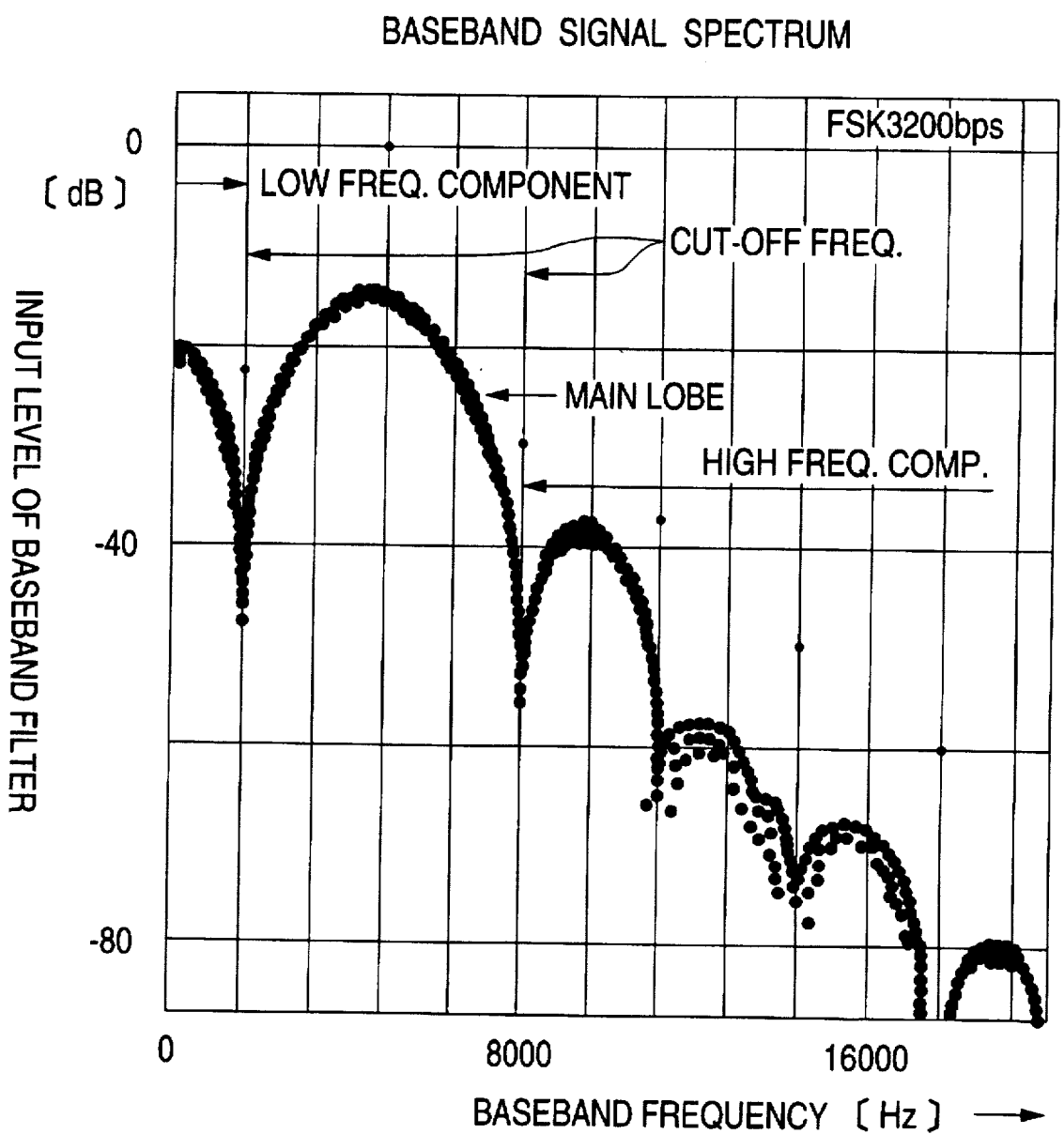
FIG. 10 is a graph showing an example of a spectrum of a signal which is input to a baseband filter at a transmission rate of binary FSK 3,200 bps.
Figure 11:
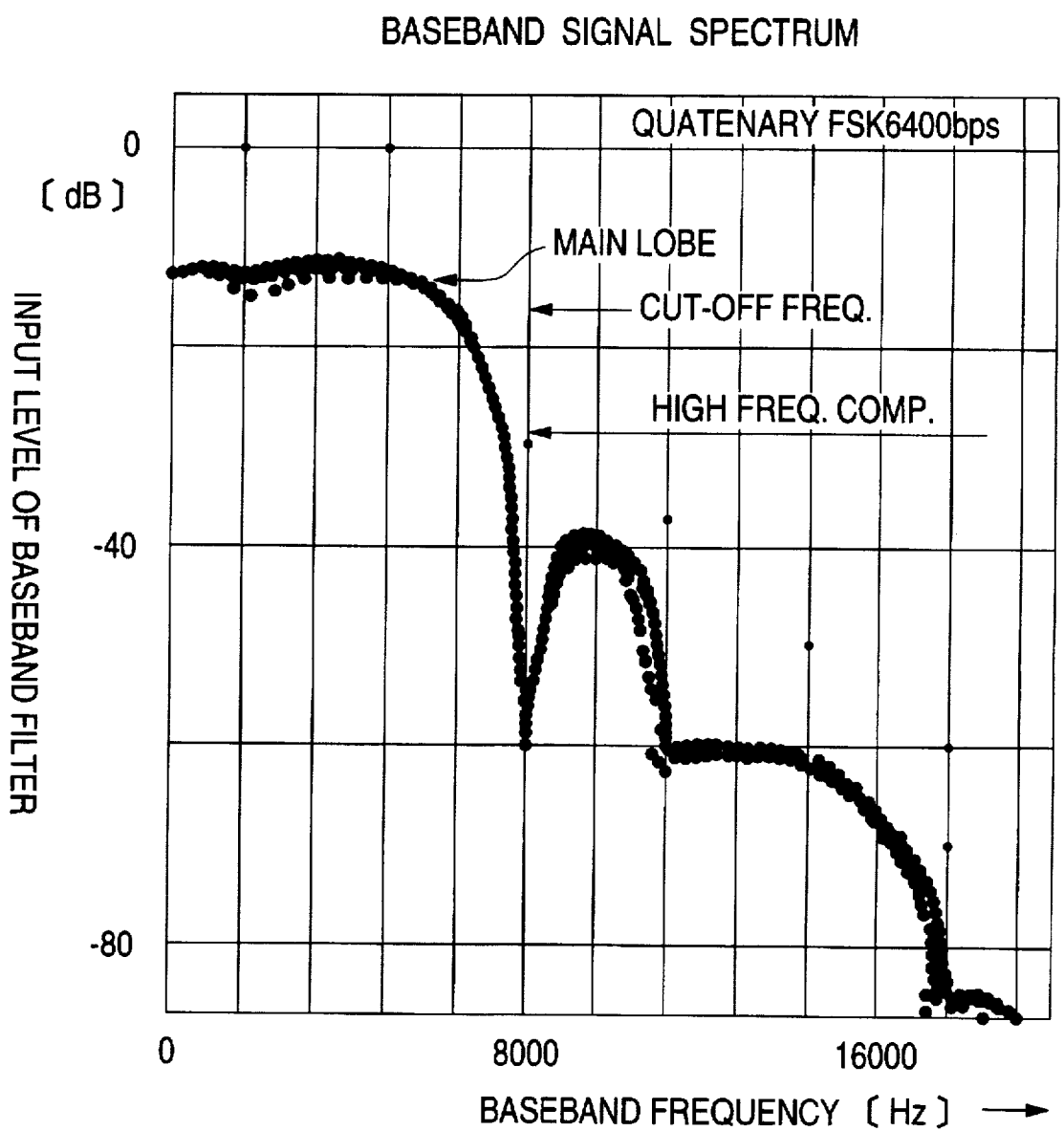
FIG. 11 is a graph showing an example of a spectrum of a signal which is input to a baseband filter at a transmission rate of quaternary FSK 6,400 bps.
Figure 12:
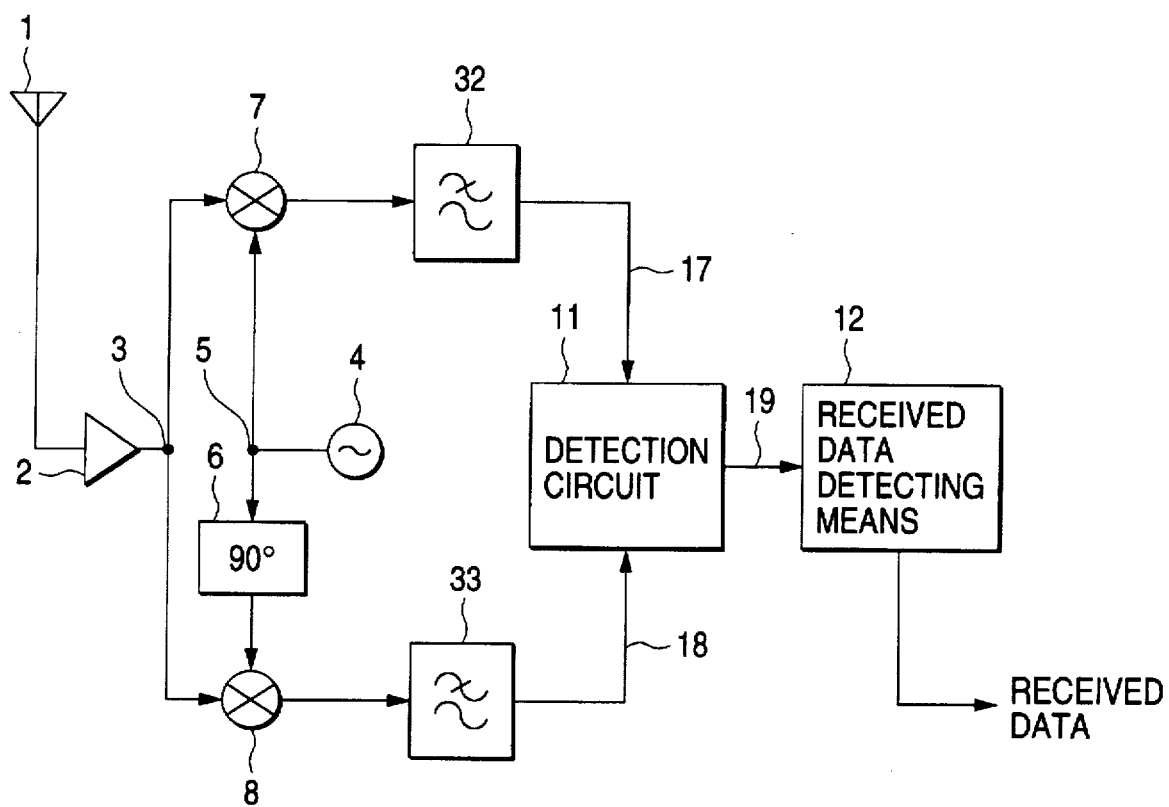
FIG. 12 is a block diagram showing the main receiving circuit portion of a direct conversion receiver of the prior art.

FIG. 9 is a graph showing an example of a spectrum of a signal which is input to a baseband filter at a transmission rate of binary FSK 1,600 bps, FIG. 10 is a graph showing an example of a spectrum of a signal which is input to a baseband filter at a transmission rate of binary FSK 3,200 bps, and FIG. 11 is a graph showing an example of a spectrum of a signal which is input to a baseband filter at a transmission rate of quaternary FSK 6,400 bps.

First, the configuration of the direct conversion receiver of the first embodiment will be described with reference to FIG. 1A. In FIG. 1A, reference numeral 1 designates a receiving antenna which receives a radio signal; 2, a received signal amplifier which amplifies the received signal from the receiving antenna 1 and outputs a modulated signal 3; 4, designates a first local oscillator which generates a first local signal 5 of a frequency that is approximately equal to the carrier frequency of the received transmission signal; 6, designates a 90-degree phase shifter which shifts the phase of the first local signal 5 by 90 degrees; 7, a first signal mixer which mixes the modulated signal 3 with the first local signal 5; and 8, a second signal mixer which mixes the modulated signal 3 with the signal that is obtained by phase-shifting the first local signal 5 by 90 degrees.

Furthermore, 9 designates a first I-low-pass filter which comprises cut-off frequency switching means, switches over and changes the cut-off frequency under control of an I-control signal output from I-low-pass filter cut-off frequency controlling means 15, and extracts only desired modulated components that are optimum for the transmission rate of reception, from an output signal (in phase with the received signal) of the first signal mixer 7, i.e., in the first embodiment, low-frequency components containing the baseband signal, thereby outputting an I-baseband signal 17. The reference numeral 10 designates a first Q-low-pass filter which comprises cut-off frequency switching means, switches over and changes the cut-off frequency under control of a Q-control signal output from Q-low-pass filter cut-off frequency controlling means 16, and extracts only desired modulated components that are optimum for the transmission rate received from an output signal (shifted in phase from the received signal by 90 degrees) of the second signal mixer 8, i.e., in the first embodiment, low-frequency components containing the baseband signal, thereby outputting a Q-baseband signal 18 which is perpendicular to the I-baseband signal 17.

The reference numeral 11 designates detecting means for adding the I-baseband signal 17 supplied from the first I-low-pass filter 9 with the Q-baseband signal 18 supplied from the first Q-low-pass filter 10, conducting detection, and outputting a demodulated signal 19; 12 designates received data detecting means for judging the demodulated signal 19, and outputting received data; 13 designates transmission rate detecting means for reading the received data output from the received data detecting means 12, recognizing the transmission rate of received data, from transmission rate information included in the received data, and outputting a transmission rate signal 14 indicative of the transmission rate; 15 designates I-low-pass filter cut-off frequency controlling means for outputting the I-control signal which controls the cut-off frequency of the first I-low-pass filter 9, under control of the transmission rate signal 14; and 16 designates Q-low-pass filter cut-off frequency controlling means for outputting the Q-control signal which controls the cut-off frequency of the first Q-low-pass filter 10, under control of the transmission rate signal 14.

Next, the operation of the direct conversion receiver of the first embodiment will be described with reference to the same figure or FIG. 1A. A radio signal which is received by the receiving antenna 1 is amplified by the received signal amplifier 2, and then output as the modulated signal 3 to the first and second signal mixers 7 and 8. On the other hand, the first local signal 5 generated by the first local oscillator 4 is mixed in the first signal mixer 7 with the modulated signal 3, and then output to the first I-low-pass filter 9. At the same time, the first local signal is shifted in phase by 90 degrees by the 90-degree phase shifter 6, then mixed in the second signal mixer 8 with the modulated signal 3, and then output to the first Q-low-pass filter 10.

The first I-low-pass filter 9 switches over and changes the cut-off frequency under control of the I-control signal output from the I-low-pass filter cut-off frequency controlling means 15, and eliminates high-frequency components from the output signal of the first signal mixer 7 so as to extract only desired modulated components which are optimum for the transmission rate of reception, i.e., low-frequency components containing the baseband signal, thereby outputting the I-baseband signal 17 which is in a low-frequency band. The first Q-low-pass filter 10 switches over and changes the cut-off frequency under control of the Q-control signal output from the Q-low-pass filter cut-off frequency controlling means 16, and eliminates high-frequency components from the output signal (shifted in phase from the received signal by 90 degrees) of the second signal mixer 8 so as to extract only desired modulated components which are optimum for the transmission rate of reception, i.e., low-frequency components containing the baseband signal, thereby outputting the Q-baseband signal 18 which is perpendicular to the I-baseband signal 17 and in a low-frequency band.

The I- and Q-baseband signals 17 and 18 which are respectively extracted as a result of passing through the first I- and Q-low-pass filters 9 and 10 are subjected to the mixing process in the detecting means 11 in the following manner. The I-baseband signal 17 is mixed with a second local signal 21 (described later) which is shifted in phase by 90 degrees. The Q-baseband signal 18 is mixed with the second local signal 21. The two mixed signals are added with each other, detected, and then output as the demodulated signal 19 to the received data detecting means 12. The received data detecting means 12 reproduces the transmission clock signal, samples and waveform-shapes the demodulated signal 19 on the basis of the reproduced transmission clock signal, and judges the signal as data sent from a transmission station (not shown). The data are output as received data to other processing means such as a CPU, and also to the transmission rate detecting means 13.

The transmission rate detecting means 13 knows the transmission rate of the received data which are succeedingly received, from transmission rate information (described later) included in the received data received from the received data detecting means 12, and outputs the transmission rate signal 14 indicative of the transmission rate. The I-low-pass filter cut-off frequency controlling means 15 receives the transmission rate signal 14, outputs the I-control signal to the first I-low-pass filter 9 under control of the signal, and switches over and changes the cut-off frequency of the first I-low-pass filter 9 to the frequency which is optimum for the transmission rate of the received transmission signal. Similarly, the Q-low-pass filter cut-off frequency controlling means 16 receives the transmission rate signal 14, outputs the Q-control signal to the first Q-low-pass filter 10 under control of the signal, and switches over and changes the cut-off frequency of the first Q-low-pass filter 10 to the frequency which is optimum for the transmission rate of the received signal.

Hereinafter, the detecting means 11 shown in FIGS. 1 and 2 will be described in detail with reference to FIG. 3. FIG. 3 is a diagram showing an example of the circuit configuration of the detecting means 11 which detects and demodulates a received FSK (frequency shift keying) signal. In FIG. 3, reference numeral 20 designates a second local oscillator which generates the second local signal 21 of a frequency (for example, 19.2 kHz) which is lower than that of the first local signal 5. Reference numeral 22 designates a second 90-degree phase shifter which shifts the phase of the second local signal 21 generated from the second local oscillator 20 by 90 degrees, and reference numeral 23 designates a third signal mixer which mixes the second local signal that is shifted in phase by 90 degrees with the I-baseband signal 17.

Furthermore, reference numeral 24 designates a fourth signal mixer which mixes the second local signal 21 with the Q-baseband signal 18, and 25 designates a signal adder which adds with each other the signals obtained as a result of the mixing operations in the third and fourth signal mixers 23 and 24. The reference numeral 26 is a waveform shaping filter which comprises a high-pass filter and a low-pass filter, and which limits the passband of the output signal of the signal adder 25, thereby extracting only the desired modulating components (for example, the baseband signal band) from the output signal of the signal adder 25. The reference numeral 27 designates a frequency detector which detects the frequency of the output signal of the waveform shaping filter 26, converts the frequency into a voltage value, and outputs the demodulated signal 19.

Next, the operation of the detecting means shown in FIG. 3 will be described with reference to the same figure or FIG. 3. As described above, the I- and Q-baseband signals 17 and 18 are perpendicular to each other, the fourth signal mixer 24 mixes the second local signal 21 from the second local oscillator 20 with the Q-baseband signal 18 and outputs the mixed signal, and the third signal mixer 23 mixes the signal which is obtained by phase-shifting the second local signal 21 by 90 degrees with the I-baseband signal 17 and outputs the mixed signal. The output signals of the third and fourth signal mixers 23 and 24 are added with each other in the signal adder 25. From the output of the signal adder 25, an FSK signal can be obtained which has the center frequency equal to the frequency of the second local signal 21 and the same frequency shift as that of the transmitted signal.

The waveform shaping filter 26 performs the waveform shaping operation in the following manner. The output signal of the signal adder 25 is filtered, and only the frequency band containing the modulated signal which is centered at the frequency of the second local signal 21 is extracted and output. The frequency components (high- and low-frequency components) other than the band are eliminated. The frequency detector 27 receives the FSK signal consisting of only the frequency band containing the modulated signal from the waveform shaping filter 26, and performs the frequency detection, with the result that the detector can obtain the demodulated signal 19.

Figure 4:
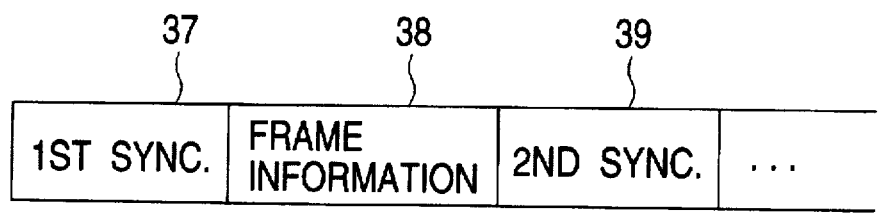
FIG. 4 is a diagram showing the beginning portion of a transmission frame according to a protocol which is used for informing of the transmission rate to be transmitted in the first and second embodiments shown in FIGS. 1 and 2.

Next, transmission rate information which is included in the received data and which can be read from the received data by the transmission rate detecting means 13 will be described with reference to FIG. 4. FIG. 4 is a diagram showing the configuration of the beginning portion of a transmission frame according to a protocol which is used for informing of the transmission rate to be transmitted and specified in the advanced radio paging system standard (RCR STD-43).

In FIG. 4, reference numeral 37 designates a first synchronizing part containing information of the transmission rate which is used in a succeeding transmission frame; 38, frame information; and 39, a second synchronizing part containing usual synchronizing information. In the transmission protocol, the first synchronizing part 37 and the frame information 38 are always transmitted at a fixed transmission rate. The first synchronizing part 37 contains transmission rate information of transmission information which is to be transmitted in the second synchronizing part 39 and the following parts. As described above, the transmission rate detecting means 13 knows the transmission rate information, and switches over the passband of the baseband filter (as described above, the term indicates all kinds of low- and high-pass filters which extract a baseband signal), so that transmission information of the second synchronizing part 39 and the following parts is obtained through the passband which is optimum for the transmission rate.

Next, an example of a low-pass filter comprising cut-off frequency switching means (or a cut-off frequency control input) which can switch over the cut-off frequency, such as the first I- and Q-low-pass filters 9 and 10 in the first embodiment shown in FIG. 1A will be described with reference to FIGS. 1A, 5, and 6. FIG. 5 shows a first example of a low-pass filter in which the cut-off frequency is switched over by changing the capacitance of a capacitive element constituting the first I- or Q-low-pass filter 9 or 10, and FIG. 6 shows a second example of a low-pass filter in which the cut-off frequency is switched over by changing the resistance of a resistive element constituting the filter 9 or 10. The structures of the low-pass filters shown in FIGS. 5 and 6 are known as structures of a passive low-pass filter. Hereinafter, I- and Q-low-pass filters are generally called also passive low-pass filters.

In FIG. 5, 40 designates a resistive element which is connected in series to the low-pass filter circuit, 41 designates a capacitive element which is connected in parallel to the low-pass filter circuit with respect to the ground and which constitutes a bypass of the low-pass filter, 44 designates a capacitive element which is connected in series to a switch 45 and connected together with the switch 45 in parallel to the capacitive element 41 with respect to the ground, and 45 designates the switch which is connected in series to the capacitive element 44 and turned ON/OFF under control of, for example, the I- or Q-control signal supplied from the I- or Q-low-pass filter cut-off frequency controlling means 15 or 16. The capacitive element 44 and the switch 45 constitute the cut-off frequency switching means.

Specifically, one terminal of the resistive element 40 serves as an input terminal 42 of the passive low-pass filter, and the other terminal is connected to the one terminal of the capacitive element 41 and that of the switch 45 and serves also as an output terminal 43 of the passive low-pass filter. The other terminal of the capacitive element 41 is grounded, and that of the switch 45 is connected to one terminal of the capacitive element 44. The other terminal of the capacitive element 44 is grounded.

Referring again to FIG. 5, the operation of the thus configured passive low-pass filter will be described. First, the low-region (low-frequency) components of the FSK signal supplied to the input terminal 42 of the passive low-pass filter passes through the resistive element 40, and the high-region (high-frequency) components are led to the ground through the capacitive element 41. As a result, only the low-region (low-frequency) components containing the desired frequency band of the FSK signal are output as, for example, the I- or Q-baseband signal 17 or 18 (see FIG. 1A) from the output terminal 43 of the passive low-pass filter.

In the example of the embodiment, the switch 45 receives the I- or Q-control signal supplied from the I- or Q-low-pass filter cut-off frequency controlling means 15 or 16 (see FIG. 1A), and is turned ON or OFF in accordance with the I- or Q-control signal. When the switch 45 is turned ON, for example, the capacitive element 44 is connected in parallel with the capacitive element 41 and between the output terminal 43 of the passive low-pass filter and the ground, so that the synthesized capacitance of the bypass of the low-pass filter is increased, thereby lowering the cut-off frequency of the low-pass filter. By contrast, when the switch 45 is turned OFF, the capacitive element 44 is disconnected, and the synthesized capacitance of the bypass of the low-pass filter is reduced, thereby raising the cut-off frequency of the low-pass filter. In this way, the cut-off frequency of the passive low-pass filter is switched over by changing the synthesized capacitance of the bypass of the low-pass filter.

When the capacitance of the capacitive element 44 is arbitrarily determined, therefore, the cut-off frequency which is to be switched over can be set to a desired value. Any kind of switch such as a transistor or a diode can be used as the switch 45 in the embodiment, as far as it can be used in an IC circuit.

Next, the second example of the low-pass filter in which the cut-off frequency is switched over by changing the resistance of a resistive element constituting the first I- or Q-low-pass filter 9 or 10 will be described with reference to FIG. 6. In the same manner as described above, I- and Q-low-pass filters are generally called also passive low-pass filters.

In FIG. 6, 46 designates a resistive element which is connected in series to the low-pass filter circuit, 47 designates a capacitive element which is connected in parallel to the low-pass filter circuit with respect to the ground and which constitutes a bypass of the low-pass filter, 50 designates a resistive element which is connected in series to a switch 51 and connected together with the switch 51 in parallel to the resistive element 46, and 51 designates the switch which is connected in series to the resistive element 50 and turned ON/OFF under control of, for example, the I- or Q-control signal supplied from the I- or Q-low-pass filter cut-off frequency controlling means 15 or 16. The resistive element 50 and the switch 51 constitute the cut-off frequency switching means.

Specifically, one terminal of the resistive element 46 serves as an input terminal 48 of the passive low-pass filter, and connected to one terminal of the resistive element 50. The other terminal is connected to the one terminal of the capacitive element 47 and that of the switch 51 and serves also as an output terminal 49 of the passive low-pass filter. The other terminal of the capacitive element 47 is grounded, and that of the switch 51 is connected to the other terminal of the resistive element 50. The switch 51 and the resistive element 50 which are connected in series with each other are connected in parallel with the resistive element 46.

Referring again to FIG. 6, the operation of the thus configured passive low-pass filter will be described. First, the low-region (low-frequency) components of the FSK signal supplied to the input terminal 48 of the passive low-pass filter passes through the resistive element 46, and the high-region (high-frequency) components are led to the ground through the capacitive element 47. As a result, only the low-region (low-frequency) components containing the desired frequency band of the FSK signal are output as, for example, the I- or Q-baseband signal 17 or 18 (see FIG. 1A) from the output terminal 49 of the passive low-pass filter.

In the example of the embodiment, the switch 51 receives the I- or Q-control signal supplied from the I- or Q-low-pass filter cut-off frequency controlling means 15 or 16 (see FIG. 1A), and is turned ON or OFF in accordance with the I- or Q-control signal. When the switch 51 is turned ON, for example, the resistive element 50 is connected in parallel with the resistive element 46 and between the input and output terminals 48 and 49 of the passive low-pass filter, so that the synthesized resistance of the low-pass filter is reduced, thereby lowering the cut-off frequency of the low-pass filter. By contrast, when the switch 51 is turned OFF, the resistive element 50 is disconnected, and the synthesized resistance of the low-pass filter is increased, thereby raising the cut-off frequency of the low-pass filter. In this way, the cut-off frequency of the passive low-pass filter is switched over by changing the synthesized resistance of the low-pass filter.

When the resistance of the resistive element 50 is arbitrarily determined, therefore, the cut-off frequency which is to be switched over can be set to a desired value. Any kind of switch such as a transistor or a diode can be used as the switch 51 in the embodiment, as far as it can be used in an IC circuit.

Next, referring to FIGS. 9 and 10, the manner of waveform-shaping the FSK signal supplied to the I- or Q-low-pass filter by switching over the cut-off frequency of the I- or Q-low-pass filter in the above-described embodiment will be described taking the case of the advanced radio paging system standard (RCR STD-43) as an example.

FIGS. 9 and 10 show an example of a frequency spectrum of the signal supplied to the first I- and Q-low-pass filters 9 and 10 in the case where the transmission data sent from the transmission station in accordance with the advanced radio paging system standard (RCR STD-43) are configured by a binary FSK signal of a frequency shift of 4.8 kHz in the form of a pseudo signal of 15 steps. FIG. 9 shows the case of a transmission rate of binary FSK 1,600 bps, and FIG. 10 the case of a transmission rate of binary FSK 3,200 bps.

As seen from the comparison between FIGS. 9 and 10, in the case of the same frequency shift, the signal frequency band of the main lobe (a signal of a frequency band which is demodulated and extracted as transmission data) of the input signal containing the baseband signal for the I- and Q-low-pass filters 9 and 10 is usually wider as the transmission rate is higher. For example, the signal frequency band of the main lobe of the baseband signal in the case of FIG. 10 where the transmission rate is binary FSK 3,200 bps is two times that in the case of FIG. 9 where the transmission rate is binary FSK 1,600 bps.

If, even when the transmission rate is changed, the cut-off frequency of the low-pass filter is fixed or unchanged as in the case of the prior art technique, the main lobe signal of the input signal is cut away as the transmission rate of the transmission signal becomes higher, with the result that the demodulation can not be optimally performed. By contrast, as the transmission rate of the transmission signal becomes lower, signals of adjacent frequencies are mixed in addition to the main lobe signal of the input signal, thereby impairing the reception sensitivity. Furthermore, an influence of adjacent channel interference becomes larger, with the result that it is impossible to perform the optimum reception.

In the embodiment, when the transmission rate is changed, therefore, the cut-off frequencies of the I- and Q-low-pass filters 9 and 10 are switched over and changed in accordance with the transmission rate as shown in FIGS. 9 and 10, so that, at any transmission rate, only the main lobe signal of the input signal is allowed to pass through the filter so as to be extracted. Consequently, it is possible to obtain a direct conversion receiver which is high sensitive and less affected by adjacent channel interference. In the above, with respect to the cut-off frequency, only the case where high-frequency components of the input signal are cut off (blocked) has been described. The case where low-frequency components are cut off will be described in the following description of a second embodiment of the invention.

Next, the configuration of the direct conversion receiver of the second embodiment of the invention will be described with reference to FIG. 2A. In FIG. 2A, 1 designates a receiving antenna which receives a radio signal, 2 designates a received signal amplifier which amplifies the received signal from the receiving antenna 1 and outputs a modulated signal 3, 4 designates a first local oscillator which generates a first local signal 5 of a frequency that is approximately equal to the carrier frequency of the received transmission signal, 6 designates a 90-degree phase shifter which shifts the phase of the first local signal 5 by 90 degrees, 7 designates a first signal mixer which mixes the modulated signal 3 with the first local signal 5, and 8 designates a second signal mixer which mixes the modulated signal 3 with the signal that is obtained by phase-shifting the first local signal 5 by 90 degrees.

Furthermore, 11 designates detecting means for adding the I-baseband signal 17 supplied from a second I-low-pass filter 32 with the Q-baseband signal 18 supplied from a second Q-low-pass filter 33, conducting detection, and outputting a demodulated signal 19; 12 designates transmission data detecting means for judging the demodulated signal 19, and outputting transmission data; 13 designates transmission rate detecting means for reading the transmission data output from the transmission data detecting means 12, recognizing the transmission rate of transmission data to be received, from transmission rate information included in the transmission data, and outputting a transmission rate signal 14 indicative of the transmission rate; 28 designates I-high-pass filter cut-off frequency controlling means for outputting an I-control signal which controls the cut-off frequency of an I-high-pass filter 30, under control of the transmission rate signal 14; and 29 designates Q-high-pass filter cut-off frequency controlling means for outputting a Q-control signal which controls the cut-off frequency of a Q-high-pass filter 31, under control of the transmission rate signal 14.

Furthermore, 30 designates an I-high-pass filter which comprises cut-off frequency switching means, switches over and changes the cut-off frequency under control of the I-control signal output from the I-high-pass filter cut-off frequency controlling means 28, and extracts only desired demodulated components that are optimum for the transmission rate of reception, from an output signal (in phase with the received signal) of the first signal mixer 7, i.e., in the second embodiment, high-frequency components containing the baseband signal. The reference numeral 31 designates a Q-high-pass filter which comprises cut-off frequency switching means, switches over and changes the cut-off frequency under control of the Q-control signal output from the Q-high-pass filter cut-off frequency controlling means 29, and extracts only desired modulated components that are optimum for the transmission rate of reception, from an output signal (shifted in phase from the received signal by 90 degrees) of the second signal mixer 8, i.e., in the second embodiment, high-frequency components containing the baseband signal.

The reference numeral 32 designates the second I-low-pass filter which receives the high-frequency components containing the desired modulated components (baseband signal) that are extracted from the output signal of the first signal mixer 7 in the I-high-pass filter 30, eliminates frequency components that are other than the desired modulated components and higher in frequency than the desired modulated components, and outputs the I-baseband signal 17. The cut-off frequency of the second I-low-pass filter is fixed. The reference numeral 33 designates the second Q-low-pass filter which receives the high-frequency components containing the desired modulated components (baseband signal) which are extracted from the output signal of the second signal mixer 8 in the Q-high-pass filter 31, eliminates components that are other than the desired modulated components and higher in frequency than the modulated components, and outputs the Q-baseband signal 18 which is perpendicular to the I-baseband signal 17. The cut-off frequency of the second Q-low-pass filter is fixed.

Next, the operation of the direct conversion receiver of the second embodiment will be described with reference to the same figure or FIG. 2A. A radio signal which is received by the receiving antenna 1 is amplified by the received signal amplifier 2, and then output as the modulated signal 3 to the first and second signal mixers 7 and 8. On the other hand, the first local signal 5 generated by the first local oscillator 4 is mixed in the first signal mixer 7 with the modulated signal 3, and then output to the I-high-pass filter 30. At the same time, the first local signal is shifted in phase by 90 degrees by the 90-degree phase shifter 6, then mixed in the second signal mixer 8 with the modulated signal 3, and then output to the Q-high-pass filter 31.

The I-high-pass filter 30 switches over and changes the cut-off frequency under control of the I-control signal output from the I-high-pass filter cut-off frequency controlling means 28, and eliminates low-frequency components from the output signal of the first signal mixer 7 so as to extract only desired modulated components which are optimum for the transmission rate of reception, i.e., high-frequency components containing the baseband signal, thereby outputting a signal of a frequency band which is higher than the cut-off frequency. The Q-high-pass filter 31 switches over and changes the cut-off frequency under control of the Q-control signal output from the Q-high-pass filter cut-off frequency controlling means 29, and eliminates low-frequency components from the output signal of the second signal mixer 8 (shifted in phase from the received signal by 90 degrees) so as to extract only desired modulated components which are optimum for the transmission rate of reception, i.e., high-frequency components containing the baseband signal, thereby outputting a signal of a frequency band which is higher than the cut-off frequency.

The second I-low-pass filter 32 eliminates high-frequency components from the signal supplied from the I-high-pass filter 30, extracts only desired modulated components which are optimum for the transmission rate of reception, i.e., the baseband signal, and outputs the baseband signal as the I-baseband signal 17. The second Q-low-pass filter 33 eliminates high-frequency components from the signal supplied from the Q-high-pass filter 31, extracts only desired modulated components which are optimum for the transmission rate of reception, i.e., the baseband signal, and outputs the baseband signal as the Q-baseband signal 18 which is perpendicular to the I-baseband signal 17.

The I- and Q-baseband signals 17 and 18 which are respectively extracted as a result of passing through the I-high-pass filter 30 and the second I-low-pass filter 32, and the Q-high-pass filter 31 and the second Q-low-pass filter 33 are subjected to the mixing process in the detecting means 11 in the following manner. The I-baseband signal 17 is mixed with a second local signal 21 (described later) which is shifted in phase by 90 degrees. The Q-baseband signal 18 is mixed with the second local signal 21. The two mixed signals are added with each other, detected, and then output as the demodulated signal 19 to the transmission data detecting means 12. The detecting means 11 has been described in detail in conjunction with FIG. 3, and hence its detailed description is omitted.

The transmission data detecting means 12 reproduces the transmission clock signal, samples and waveform-shapes the demodulated signal 19 on the basis of the reproduced transmission clock signal, and judges the signal as data sent from a transmission station (not shown). The data are output as transmission data to other processing means such as a CPU, and also to the transmission rate detecting means 13. The transmission rate detecting means 13 knows the transmission rate of the transmission data which are succeedingly received, from transmission rate information (described later) included in the transmission data received from the transmission data detecting means 12, and outputs the transmission rate signal 14 indicative of the transmission rate.

The I-high-pass filter cut-off frequency controlling means 28 receives the transmission rate signal 14, outputs the I-control signal to the I-high-pass filter 30 under control of the signal, and switches over and changes the cut-off frequency of the I-high-pass filter 30 to the frequency which is optimum for the transmission rate of the received transmission signal (eliminates low-frequency components and extracts only high-frequency components containing desired modulated components). Similarly, the Q-high-pass filter cut-off frequency controlling means 29 receives the transmission rate signal 14, outputs the Q-control signal to the Q-high-pass filter 31 under control of the signal, and switches over and changes the cut-off frequency of the Q-high-pass filter 31 to the frequency which is optimum for the transmission rate of the received transmission signal (eliminates low-frequency components and extracts only high-frequency components containing desired modulated components).

Next, an example of a high-pass filter comprising cut-off frequency switching means (or a cut-off frequency control input) which can change the cut-off frequency, such as the I- and Q-high-pass filters 30 and 31 in the second embodiment shown in FIG. 2A will be described with reference to FIGS. 2, 7, and 8. FIG. 7 shows a first example of a high-pass filter in which the cut-off frequency is switched over by changing the resistance of a resistive element constituting the I- or Q-high-pass filter 30 or 31, and FIG. 8 shows a second example of a high-pass filter in which the cut-off frequency is switched over by changing the capacitance of a capacitive element constituting the filter 30 or 31. The structures of the high-pass filters shown in FIGS. 7 and 8 are known as structures of a passive high-pass filter. Hereinafter, I- and Q-high-pass filters are generally called also passive high-pass filters.

In FIG. 7, 60 designates a capacitive element which is connected in series to the high-pass filter circuit, 61 designates a resistive element which is connected in parallel to the high-pass filter circuit with respect to the ground and which constitutes a bypass of the high-pass filter, 64 designates a resistive element which is connected in series to a switch 65 and connected together with the switch 65 in parallel to the resistive element 61, and 65 designates the switch which is connected in series to the resistive element 64 and turned ON/OFF under control of, for example, the I- or Q-control signal supplied from the I- or Q-high-pass filter cut-off frequency controlling means 28 or 29. The resistive element 64 and the switch 65 constitute the cut-off frequency switching means.

Specifically, one terminal of the capacitive element 60 serves as an input terminal 62 of the passive high-pass filter, and the other terminal is connected to the one terminal of the resistive element 61 and that of the switch 65 and serves also as an output terminal 63 of the passive high-pass filter. The other terminal of the resistive element 61 is grounded, and that of the switch 65 is connected to one terminal of the resistive element 64. The other terminal of the resistive element 64 is grounded.

Referring again to FIG. 7, the operation of the thus configured passive high-pass filter will be described. First, the high-region (high-frequency) components of the FSK signal supplied to the input terminal 62 of the passive high-pass filter passes through the capacitive element 60, and the low-region (low-frequency) components are led to the ground through the resistive element 61. As a result, only the high-region (high-frequency) components containing the desired frequency band of the FSK signal are output from the output terminal 63 of the passive high-pass filter.

In the example of the embodiment, the switch 65 receives the I- or Q-control signal supplied from the I- or Q-high-pass filter cut-off frequency controlling means 28 or 29 (see FIG. 2A), and is turned ON or OFF in accordance with the I- or Q-control signal. When the switch 65 is turned ON, for example, the resistive element 64 is connected in parallel with the resistive element 61 and between the output terminal 63 of the passive high-pass filter and the ground, so that the synthesized resistance of the bypass of the high-pass filter is reduced, thereby lowering the cut-off frequency of the high-pass filter. By contrast, when the switch 65 is turned OFF, the resistive element 64 is disconnected, and the synthesized resistance of the bypass of the high-pass filter is increased, thereby raising the cut-off frequency of the high-pass filter. In this way, the cut-off frequency of the passive high-pass filter is switched over by changing the synthesized resistance of the bypass of the high-pass filter.

When the resistance of the resistive element 64 is arbitrarily determined, therefore, the cut-off frequency which is to be switched over can be set to a desired value. Any kind of switch such as a transistor or a diode can be used as the switch 65 in the embodiment, as far as it can be used in an IC circuit.

Next, the second example of the high-pass filter in which the cut-off frequency is switched over by changing the capacitance of a capacitive element constituting the I- or Q-high-pass filter 30 or 31 will be described with reference to FIG. 8. In the same manner as described above, I- and Q-high-pass filters are generally called also passive high-pass filters.

In FIG. 8, reference numeral 66 designates a capacitive element which is connected in series to the high-pass filter circuit, 67 designates a resistive element which is connected in parallel to the high-pass filter circuit with respect to the ground and which constitutes a bypass of the high-pass filter, 70 designates a capacitive element which is connected in series to a switch 71 and connected together with the switch 71 in parallel to the capacitive element 66, and 71 designates the switch which is connected in series to the capacitive element 70 and turned ON/OFF under control of, for example, the I- or Q-control signal supplied from the I- or Q-high-pass filter cut-off frequency controlling means 28 or 29. The capacitive element 70 and the switch 71 constitute the cut-off frequency switching means.

Specifically, one terminal of the capacitive element 66 serves as an input terminal 68 of the passive high-pass filter, and connected to one terminal of the capacitive element 70. The other terminal is connected to the one terminal of the resistive element 67 and that of the switch 71 and serves also as an output terminal 69 of the passive high-pass filter. The other terminal of the resistive element 67 is grounded, and that of the switch 71 is connected to the other terminal of the capacitive element 70. The switch 71 and the capacitive element 70 which are connected in series with each other are connected in parallel with the capacitive element 66.

Referring again to FIG. 8, the operation of the thus configured passive high-pass filter will be described. First, the high-region (high-frequency) components of the FSK signal supplied to the input terminal 68 of the passive high-pass filter passes through the capacitive element 66, and the low-region (low-frequency) components are led to the ground through the resistive element 67. As a result, only the high-region (high-frequency) components containing the desired frequency band of the FSK signal are output from the output terminal 67 of the passive high-pass filter.

In the example of the embodiment, the switch 71 receives the I- or Q-control signal supplied from the I- or Q-high-pass filter cut-off frequency controlling means 28 or 29 (see FIG. 2A), and is turned ON or OFF in accordance with the I- or Q-control signal. When the switch 71 is turned ON, for example, the capacitive element 70 is connected in parallel with the capacitive element 66 and between the input and output terminals 68 and 69 of the passive high-pass filter, so that the synthesized capacitance of the high-pass filter is increased, thereby lowering the cut-off frequency of the high-pass filter. By contrast, when the switch 71 is turned OFF, the capacitive element 70 is disconnected, and the synthesized capacitance of the high-pass filter is reduced, thereby raising the cut-off frequency of the high-pass filter. In this way, the cut-off frequency of the passive high-pass filter is switched over by changing the synthesized capacitance of the high-pass filter.

When the capacitance of the capacitive element 70 is arbitrarily determined, therefore, the cut-off frequency which is to be switched over can be set to a desired value. Any kind of switch such as a transistor or a diode can be used as the switch 71 in the embodiment, as far as it can be used in an IC circuit.

Next, referring to FIGS. 9 and 11, the manner of waveform-shaping the FSK signal supplied to the I- or Q-high-pass filter by switching over the cut-off frequency of the I- or Q-high-pass filter in the above-described embodiment will be described taking the case of the advanced radio paging system standard (RCR STD-43) as an example.

FIG. 11 shows a frequency spectrum of the signal supplied to the first I- and Q-high-pass filters 30 and 31 in the case where the transmission data sent from the transmission station in accordance with the advanced radio paging system standard (RCR STD-43) are converted from a binary code into a quaternary code on the basis of a pseudo signal of 15 steps and the transmission rate at a frequency shift of 1.6 kHz and 4.8 kHz is quaternary FSK 6,400 bps. As described above, FIG. 9 shows a frequency spectrum in the case where the transmission rate is binary FSK 1,600 bps.

As seen from the comparison between FIGS. 9 and 11, in the case of the same frequency shift, the signal frequency band of the main lobe (a signal of a frequency band which is demodulated and extracted as transmission data) of the input signal containing the baseband signal for the I- and Q-high-pass filters 30 and 31 is usually wider as the transmission rate is higher. For example, the signal frequency band of the main lobe of the baseband signal in the case of FIG. 11 where the transmission rate is quaternary FSK 6,400 bps elongates to a frequency band which is lower than that of the main lobe of the baseband signal in the case of FIG. 9 where the transmission rate is binary FSK 1,600 bps, or to about 0 Hz.

If, even when the transmission rate is changed, a high-pass filter is not used and the low-frequency band is not cut off as in the case of the prior art technique, signals of adjacent frequencies are mixed in addition to the main lobe signal of the input signal, thereby impairing the reception sensitivity. Furthermore, an influence of adjacent channel interference becomes larger, with the result that it is impossible to perform the optimum reception. By contrast, in the case where the low-frequency band of the input signal is always cut off, the low-region components of the main lobe signal of the input signal are cut away when the transmission rate of the transmission signal becomes higher, with the result that it is impossible to optimally perform the demodulation.

In the embodiment, when the transmission rate is changed, therefore, the cut-off frequencies of the I- and Q-high-pass filters 30 and 31 are switched over and changed in accordance with the transmission rate as shown in FIGS. 9 and 11, so that, at any transmission rate, only the main lobe signal of the input signal is allowed to pass through the filter so as to be extracted. Consequently, it is possible to obtain a direct conversion receiver which is high sensitive and less affected by adjacent channel interference. In the above, with respect to the cut-off frequency, only the case where low-frequency components of the input signal are cut off has been described. In the case where high-frequency components are cut off, the receiver is configured as described in the first embodiment.

In the above description of FIGS. 5 to 8, the case where a single switch which connects or disconnects a capacitive or resistive element is used has been described. Alternatively, the receiver may be provided with plural switches and capacitive or resistive elements which are switched over by the switches, and the switches may be turned ON/OFF by the I- or Q-control signal output from the high- or low-pass filter cut-off frequency controlling means in accordance with the plural transmission rates, thereby setting plural cut-off frequencies. In the alternative, the passive low-pass filters shown in FIGS. 5 and 6 may be combinedly used, or the passive high-pass filters shown in FIGS. 7 and 8 may be combinedly used.

In the above described embodiments, the low-pass filter and the high-pass filter are constituted by capacitor and resister elements. In stead of the resister elements, a resister element formed by a current control circuit may be used to constitute a filter circuit.

Further, in the above described embodiments, the cut-off frequency switching means provided in the filter is constituted by the switching means and is on-off controlled in response to the controlling signal. Alternatively, it can be used a variable resister which is continuously controlled in response to the control signal so that the filtering characteristic can be continuously controlled.

In the first embodiment shown in FIG. 1A, the first I- and Q-low-pass filters 9 and 10 in which the cut-off frequency can be switched over and changed have been described. Alternatively, I- and Q-high-pass filters in which the cut-off frequency is fixed may be respectively connected in series to the first I- and Q-low-pass filters 9 and 10, and a frequency which is lower than that of the desired main lobe signal may be blocked.

In the embodiments, the cut-off frequencies of I- and Q-low-pass filters, or those of the I- and Q-high-pass filters are switched over. Alternatively, all the cut-off frequencies of I- and Q-low-pass filters and the I- and Q-high-pass filters may be switched over.

In the first embodiment shown in FIG. 1A, the I low-pass filter cut-off frequency controlling means 15 and Q low-pass filter cut-off frequency controlling means 16 are respectively provided to control the I low-pass filter 9 and Q low-pass filter 10. Alternatively, as shown in FIG. 1B, an I-Q low-pass filter cut-off frequency common controlling means 15A may be provided. The I low-pass filter 9 and Q low-pass filter 10 can be controlled by a single low-pass filter controlling signal output from the I-Q low-pass filter cut-off frequency common controlling means 15A.

In the second embodiment shown in FIG. 2A, the I high-pass filter cut-off frequency controlling means 28 and Q-high-pass filter cut-off frequency controlling means 29 are respectively provided to control the I high-pass filter 30 and Q high-pass filter 31. Alternatively, as shown in FIG. 2B, an I-Q high-pass filter cut-off frequency common controlling means 28A can be provided. The I high-pass filter 30 and Q high-pass filter 10 may be controlled by a single high-pass filter controlling signal output from the I-Q common high-pass filter cut-off frequency controlling means 28A.

The direct conversion receiver having a filter characteristic switching circuit according to the invention is configured as described above and particularly comprises: means for reading transmission rate information of a transmission signal sent from a transmission station, from received transmission data, and generating I- and Q-control signals corresponding to the transmission rate information; and baseband filters in which the cut-off frequency is switched over by the I- and Q-control signals. The cut-off frequencies of the baseband filters are automatically switched over in accordance with the transmission rate of the transmission signal. At any transmission rate, therefore, the reception sensitivity is improved or maintained at an optimum level and a demodulated signal wherein adjacent channel interference is eliminated or at the lowest level can be obtained.

What is claimed is:

1. A direct conversion receiver comprising:

a demodulating circuit for demodulating a received FSK modulated signal, said demodulating circuit including a local oscillator, a phase shifter, first and second mixers, first and second filter means, and a detecting circuit;

data detecting means for reproducing a received data from a signal demodulated by said demodulating circuit;

transmission rate detecting means for detecting transmission rate information from the received data, and outputting a transmission rate signal; and cut-off frequency controlling means for outputting a control signal to control a cut-off frequency of said first and second filters in response to the transmission rate signal.

2. A direct conversion receiver as claimed in claim 1, wherein: said local oscillator generates a local signal of a frequency which is approximately equal to a carrier frequency of the modulated signal;

said phase shifter shifts a phase of the local signal by 90 degrees;

said first mixer mixes the modulated signal with the local signal;

said second mixer mixes the modulated signal with the 90-degree phase-shifted signal;

said first filter means includes an I-low-pass filter which comprises cut-off frequency switching means for switching over and setting a cut-off frequency under control of an I-control signal in accordance with a transmission rate of the received signal, and which eliminates high-frequency components from an output signal of said first signal mixer in accordance with the cut-off frequency which is switched over and set, and extracts an I-baseband signal;

said second filter means includes a first Q-low-pass filter which comprises cut-off frequency switching means for switching over and setting a cut-off frequency under control of a Q-control signal in accordance with the transmission rate of the received signal, and which eliminates high-frequency components from an output signal of said second signal mixer in accordance with the cut-off frequency which is switched over and set, and extracts a Q-baseband signal;

said detecting circuit processes the I-baseband signal and the Q-baseband signal, and outputting a demodulated signal; and cut-off frequency controlling means comprises I-low-pass filter cut-off frequency controlling means for outputting the I-control signal to said first I-low-pass filter under control of the transmission rate signal, the I-control signal controlling the cut-off frequency of said first I-low-pass filter; and Q-low-pass filter cut-off frequency controlling means for outputting the Q-control signal to said first Q-low-pass filter under control of the transmission rate signal, the Q-control signal controlling the cut-off frequency of said first Q-low-pass filter, thereby the cut-off frequencies of said first I- and Q-low-pass filters being switched over and set in accordance with the transmission rate of the received signal.

3. A direct conversion receiver according to claim 2, said demodulating circuit further comprises:

an I-high-pass filter which eliminates low-frequency components from the output signal of said first mixer in accordance with the cut-off frequency, and which outputs high-frequency components containing desired modulating components to said first I-low-pass filter; and, a Q-high-pass filter which eliminates low-frequency components from the output signal of said second mixer in accordance with the cut-off frequency, and which outputs high-frequency components containing desired modulating components to said first Q-low-pass filter.

4. A direct conversion receiver as claimed in claim 1, wherein:

said local oscillator generates a local signal of a frequency which is approximately equal to a carrier frequency of said modulated signal;

said phase shifter shifts a phase of the local signal by 90 degrees;

said first mixer mixes the modulated signal with the local signal;

said second mixer mixes the modulated signal with the 90-degree phase-shifter signal;

said first filter means includes: an I-high-pass filter which comprises cut-off frequency switching means for switching over and setting a cut-off frequency under control of an I-control signal in accordance with a transmission rate of the received signal, and which eliminates low-frequency components from an output signal of said first signal mixer in accordance with the cut-off frequency which is switched and set, and outputs high-frequency components containing desired modulating components; and an I-low-pass filter which eliminates high-frequency components from the high-frequency components containing desired modulating components and output from said I-high-pass filter, in accordance with the cut-off frequency which is set, and extracts an I-baseband signal;

said second filter means includes: a Q-high-pass filter which comprises cut-off frequency switching means for switching over and setting a cut-off frequency under control of a Q-control signal in accordance with the transmission rate of the received signal, and which eliminates low-frequency components from an output signal of said second signal mixer in accordance with the cut-off frequency which is switched and set, and outputs high-frequency components containing desired modulating components; and a Q-low-pass filter which eliminates high-frequency components from the high-frequency components containing desired modulating components and output from said Q-high-pass filter, in accordance with the cut-off frequency which is set, and extracts a Q-baseband signal;

detecting means for processing the I-baseband signal and the Q-baseband signal, and outputting a demodulated signal;

said cut-off frequency controlling means comprises: I-high-pass filter cut-off frequency controlling means for outputting the I-control signal to said I-high-pass filter under control of the transmission rate signal, the I-control signal controlling the cut-off frequency of said I-high-pass filter; and Q-high-pass filter cut-off frequency controlling means for outputting the Q-control signal to said Q-high-pass filter under control of the transmission rate signal, the Q-control signal controlling the cut-off frequency of said Q-high-pass filter, whereby the cut-off frequencies of said I- and Q-high-pass filters being switched over and set in accordance with the transmission rate of the received signal.

5. A direct conversion receiver according to claim 4, wherein said second I-low-pass filter comprises cut-off frequency switching means for switching over and setting the cut-off frequency under control of said I-control signal in accordance with the transmission rate of the received signal, eliminates high-frequency components from the high-frequency components containing the desired modulating components and output from said I-high-pass filter in accordance with the cut-off frequency which is switched over and set, and extracts the I-baseband signal, and said second Q-low-pass filter comprises cut-off frequency switching means for switching over and setting the cut-off frequency under control of said Q-control signal in accordance with the transmission rate of the received signal, eliminates high-frequency components from the high-frequency components containing the desired modulating components and output from said Q-high-pass filter in accordance with the cut-off frequency which is switched over and set, and extracts the Q-baseband signal.

6. A direct conversion receiver according to claim 1, 2, 3, 4, or 5 wherein said detecting means comprises:

a second local oscillator which generates a second local signal which is lower in frequency than said first local signal;

a second 90-degree phase shifter which phase-shifts the second local signal by 90 degrees;

a third signal mixer which mixes the I-baseband signal with the signal which is obtained by phase-shifting the second local signal by 90 degrees;

a fourth signal mixer which mixes the Q-baseband signal with the second local signal;

a signal adder which adds output signals of said third and fourth signal mixers with each other;

a waveform shaping filter which comprises a high-pass filter and a low-pass filter, and which limits a passband, and extracts only the desired modulating components from an output signal of said signal adder; and a frequency detector which detects a frequency of an output signal of said waveform shaping filter, converts the frequency into a voltage value, and outputs the demodulated signal.

7. A direct conversion receiver according to claim 6 wherein each of said cut-off frequency switching means comprises at least one capacitive element, at least one resistive element, and at least one switch, and said switch is controlled by the I- or Q-control signal to switch over and change a capacitance of said capacitive element or a resistance of said resistive element, thereby switching over the cut-off frequency of said low- or high-pass filter.

8. A direct conversion receiver according to claim 6 wherein each of said cut-off frequency switching means comprises at least one capacitive element, at least one resistive element, and at least one switch, and said switch is controlled by the I- or Q-control signal to switch over and change a capacitance of said capacitive element and a resistance of said resistive element, thereby switching over the cut-off frequency of said low- or high-pass filter.

9. A direct conversion receiver according to claim 1, 2, 3, 4, or 5 wherein each of said cut-off frequency switching means comprises at least one capacitive element, at least one resistive element, and at least one switch, and said switch is controlled by the I- or Q-control signal to switch over and change a capacitance of said capacitive element or a resistance of said resistive element, thereby switching over the cut-off frequency of said low- or high-pass filter.

10. A direct conversion receiver according to claim 1, 2, 3, 4, or 5 wherein each of said cut-off frequency switching means comprises at least one capacitive element, at least one resistive element, and at least one switch, and said switch is controlled by the I- or Q-control signal to switch over and change a capacitance of said capacitive element and a resistance of said resistive element, thereby switching over the cut-off frequency of said low- or high-pass filter.

* * * * *